United States Patent Office 3,461,387
Patented Aug. 12, 1969

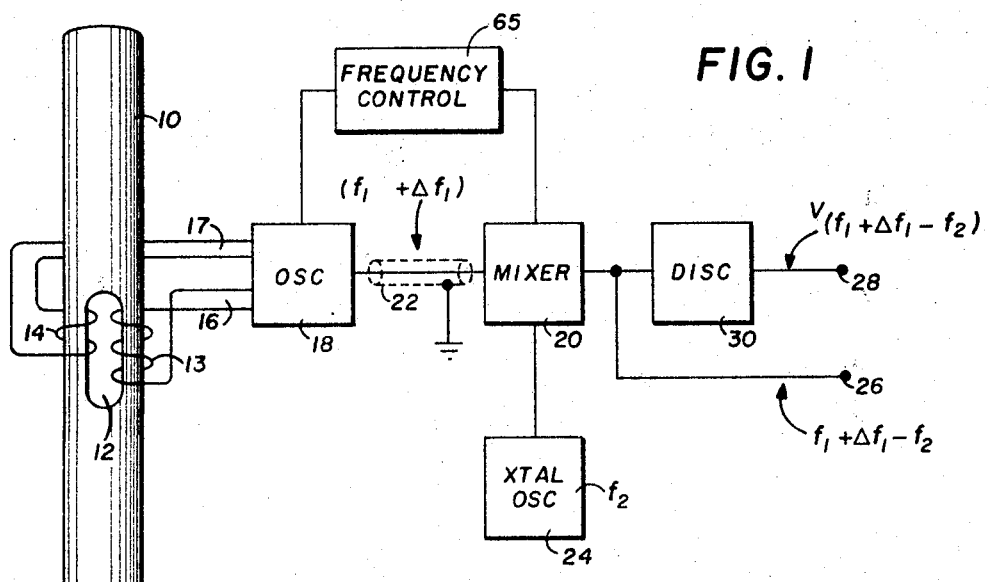
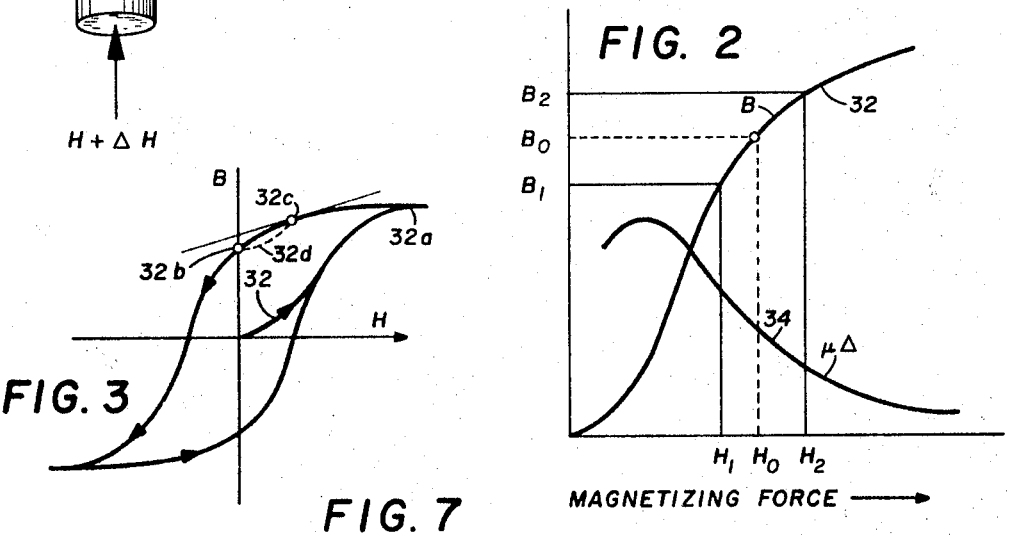
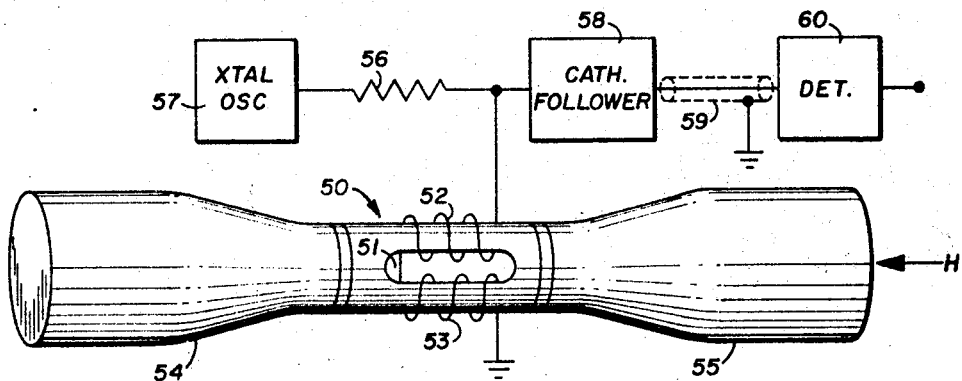

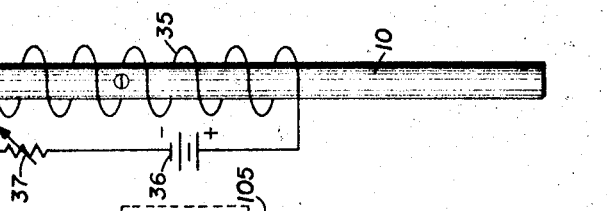
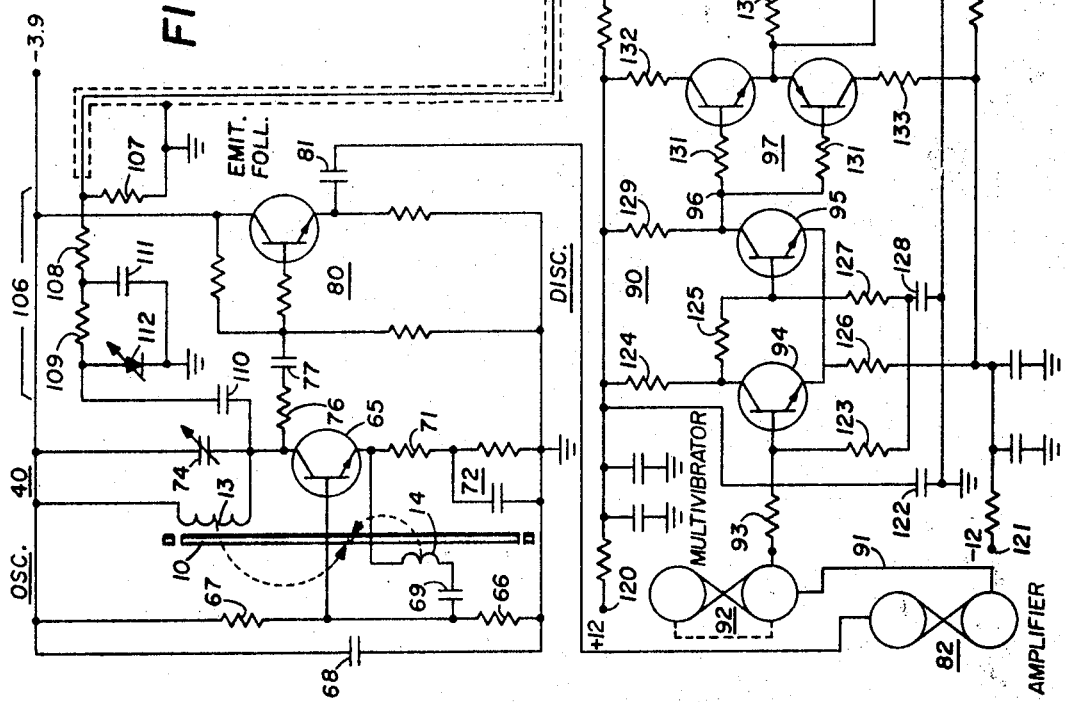

3,461,387
MAGNETIC FIELD DETECTOR USING A VARIABLE INDUCTANCE ROD
Fred J. Morris, George F. Roberts, and Robert L. Waters, Austin, Tex., assignors to The Electro-Mechanics Company, Austin, Tex., a corporation of Texas
Filed Apr. 20, 1965, Ser. No. 449,434
Int. Cl. H04b 1/06, 1/16
U.S. Cl. 325—363        15 Claims

ABSTRACT OF THE DISCLOSURE

To detect the magnitude of the magnetic component of received radio-frequency signals, a ferromagnetic rod with a coil passing through a central aperture is connected to an oscillator circuit tuned to produce an RF signal which varies in frequency in response to variations in the incremental permeability of the rod.

---

This invention relates to an apparatus for detecting electromagnetic radio-frequency signals and, more particularly, to the measurement of the magnitude and direction of the magnetic component of such signals while discriminating against magnetic field changes above and/or below the frequency of interest.

Electromagnetic radiation detectors generally employed in radio receivers involve the use of tuned amplifiers which are connected to an antenna. An antenna signal voltage is developed which is related to the rate of change of the magnetic component of the radiated field; or to the voltage induced on the antenna by the electric component of the radiated field; or to a combination of both. The signal voltage is subsequently amplified and used or its modulation detected. Such systems in general require antenna size to be related to wavelength.

The principal object of the present invention is to provide an improved receiver which is sensitive only to the magnitude of the magnetic component of the radiated signal independent of the rate of change of the signal.

Another object of the present invention is to provide an improved apparatus for measuring and indicating the direction of the magnetic component of the received signals.

Another object of the present invention is to provide a system having a very broad band frequency response to enable the study or identification of waveforms representing radiated RF magnetic pulses.

In accordance with this invention, a sensor is formed of material having a high Q in the band of the order of at least four times the RF frequency to be detected. The sensor is pre-treated for operation at a predetermined point on its B–H characteristic curve to permit it to function in an RF receiver system. The inductance of the sensor is then varied in accordance with the variations of the magnetic component of received electromagnetic radiation. The variations in impedance are then sensed. In one embodiment such variations control the frequency of an oscillating circuit. The A.C. signal produced has a magnitude which may remain fixed but whose frequency varies in accordance with variations in the magnitude of the magnetic component of the received signal. The rate variation in the signal controls the rate at which the received signal varies in frequency. A variation in magnitude of a magnetic component may thus be linearly transformed into a variation of the frequency of the oscillator circuit.

For a more complete understanding of the present invention and for further objects and advantages thereof, reference may now be had to the following description taken in conjunction with the accompanying drawings in which:

FIGURE 1 illustrates the elements of a basic variable mµ RF receiver;

FIGURE 2 is a graph showing typical relationships between variations in magnetization and susceptability of a ferrite material;

FIGURE 3 illustrates operation of the present invention;

FIGURE 4 illustrates pretreatment of a sensor in accordance with the relationships shown in FIGURE 3;

FIGURE 5 further illustrates pretreatment of the sensor;

FIGURE 6 illustrates an oscillator-mixer circuit used with the sensor of FIGURES 1 and 3; and FIGURE 7 illustrates a modified sensor with collector pole pieces in the AM system.

In FIGURE 1, a receiver circuit embodying the present invention has been shown, comprising a sensor 10 having a central slot 12 therein. Windings 13 and 14 are wound on the segments of the sensor 10 adjacent to the slot 12. Channels 16 and 17 connect the windings 13 and 14 to an oscillator 18. The oscillator, looking into lines 16 and 17, sees variable inductances which, as will hereinafter be explained, control the frequency of the signal generated by oscillator 18.

The output signal from oscillator 18 is fed to a mixer 20 by way of a line 22. A fixed or crystal controlled oscillator 24 serves to energize a second input to the mixer 20 so that a modulation product appears at output terminal 26. An analog output signal may thus be produced at output terminal 28 by means of a suitable discriminator 30.

The sensor 10 is of a material in which the incremental permeability changes in dependence upon the magnetizing force. In a preferred embodiment, the sensor is a slotted ferrite bar or rod having a length to diameter ratio of about 25. When a constant magnetic field acts upon such sensor material and an additional or superposed field alternates cyclically between two limiting values, the cyclically changing induction divided by the cyclically changing field strength is called the incremental permeability. It is this variation in the permeability of a sensor material which gives rise to the variation of the inductance of the sensor 10 in oscillator circuit 18.

Materials from which the sensing element can be made include a number of combinations of magnetic constituents which result in significant values of incremental permeability. The availability of various materials having different incremental permeability characteristics permits construction of sensors of various ranges of sensitivity and frequency response.

In order for the sensor to operate in the radio-frequency range, it is necessary that two conditions be satisfied, namely the material must have a high permeability and must have low losses. While any one of many materials currently available may be used to operate satisfactorily in the D.C. and in the low audio range, the necessity of maintaining a high Q in a sensor operating at radio frequencies makes necessary the observance of particular requirements in the fabrication of the sensor element.

Suitable materials from which an RF sensor may be formed are Ferramics, manufactured and sold by Indiana General Corporation, Electronics Division, Keasby, N. J., and identified as Q3, or Q4 (MF4888). Both of these materials have a high permeability and a high Q high in the RF band. The material Q4 has a Q of 140 at 200 mc., 100 at 300 mc., and 80 at 400 mc. Such materials are employed, preferably with pretreatment of the character hereinafter described, to permit optimum operation over an extremely wide band extending into the RF range. The band may extend from below about 100 kc. to 100 mc. or more. Ceramag 2285A, sold by Stackpole Carbon Company, in St. Marys, Pa., also is satisfactory.

Operation is illustrated in FIGURES 2 and 3. Curve 32, FIGURE 2, is representative of the B–H characteristics of a ferrite material, where H is the magnetizing force and B is the induced flux density. Within limits, the relationship between B and H is predictable. Curve 34 shows a more important relationship, that of incremental permeability $\mu\Delta$ versus magnetizing force. The incremental permeability curve 34 represents the ratio $\Delta B/\Delta H$ at various points along the B–H curve. It is this parameter which determines the inductance of the coils 13 and 14 wound about the core of sensor 10. The key fact is that if the magnetizing force H varies, there is a resulting change in the inductance of the coil. A change in inductance causes a change in the resonant frequency of the oscillator 18 and, thus, a change in output frequency. The characteristics of the sensing material may be controlled by altering its size and shape and by subjecting it to various external influences.

In accordance with the present invention, the characteristics of the sensing materials are controlled by pretreatment. The sensor, magnetized in accordance with the curve 32, will reach a saturation point 32a whereupon any further increase in the magnetization H will not change the flux B in the sensor. The permanent induction is established in the material by the application and removal of the force H. When the force H is removed, the magnetization curve exhibits the conventional hysteresis characteristic. With the magnetization force removed, the permanent induction is represented by the point 32b. Pretreatment further involves steps such that operation will take place at point 32c.

Pretreatment may be carried out in accordance with the procedure illustrated in FIGURE 4. Sensor 10 is positioned inside a solenoid winding 35. The winding is connected to a battery 36 by way of a control 37. The control 37 may be varied so that the sensor 10 is magnetized in accordance with the curve 32, FIGURE 3. The energizing circuit for the solenoid 35 may then be opened so that the magnetization will return to point 32b. Thereafter, the sensor will be provided with the suitable coils and as shown in FIGURE 5 will be encased in a holder 38 made of a high dielectric material. Permanent magnets 39 and 40 are then introduced into the holder 38 adjacent to the ends of the sensor 10 and are of such polarity as to change the magnetization of the sensor 10 in accordance with the dotted curve 32d so that the resultant magnetization of the sensor 10 corresponds to the point 32c of FIGURE 3. Preferably the magnetization represented by point 32c is much higher than that represented by the earth's magnetic field.

While the pretreatment involved in the use of the solenoid 35 has been found to be useful, a preferred method of pretreatment involves the use only of magnets 39 and 40. More particularly, the sensor 10 may be placed in a suitable holder. The magnets 39 and 40 may then be moved along the axis of the sensor 10 until they are in contact with the ends or close enough to the sensor 10 that it will be driven to saturation. Thereafter, the magnets will be moved away from the sensor 10 until the magnetization corresponds with point 32c. Thus, in this mode of pretreatment there is no reversal of the course of magnetization as represented by the dotted line of 32d of FIGURE 3. Rather, the magnetization follows the curve 32 to the saturation point 32a and then reduces back to point 32c where it is stopped. It is then found that this mode of pretreatment is more reliable with uniform results as compared with pretreatment involving the solenoid 35. It might be thought that a bias could be provided by current flowing in coils linked to the core. However, losses in such coils have been found to be such as to prevent operation in the RF band.

With a pretreated sensor, a suitable circuit may then be provided for operation in the RF band. FIGURE 1 illustrates one mode of operation. Then sensor 10 serves as the inductance portion of a tuned circuit which determines the frequency of an oscillator. The system may be employed to detect RF signals in the range up to as high as 3000 mc. As the intensity of the ambient RF field varies, the resonant frequency of the tuned circuit shifts proportionately. If a steady field H is applied then the FM output at terminal 26 is $(f_1-f_2)$ and the analog output at terminal 28 is $V(f_1-f_2)$. When a variation $\Delta H$ occurs, then the two outputs are $(f_1+\Delta f_1-f_2)$ and $V(f_1+\Delta f_1-f_2)$, respectively. In other words, the change in field intensity causes a frequency shift at the FM output terminal 26 and a shift in voltage at the analog output terminal 28. Such changes reliably repersent variations in the magnetic component of the electromagnetic field.

In FIGURE 6 a circuit is illustrated which is proportioned for detection of RF signals of the order of 10 mc. and operates in a somewhat different mode than the circuit of FIGURE 1. While different specific circuits will be employed in different applications of the invention, the circuits of FIGURES 1 and 6 are shown as representative of suitable circuits.

The system of FIGURE 6 shows the sensor 10 with coils 13 and 14 diagrammatically coupled thereto. Coils 13 and 14 are connected in the circuit of oscillator 40. The oscillator includes a transistor 65 with resistors 66 and 67 connected to the base. A condenser 68 is connected across the extremities of the resistors 66 and 67. A condenser 69 is connected between one terminal of coil 14 and the base of transistor 65. The other terminal of coil 14 is connected to the emitter of transitor 65. The emitter is connected to ground 70 by way of resistor 71 and the RC circuit 72. The collector of transistor 65 is connected to the negative bus 73 by way of an LC circuit which includes the coil 13 and a parallel condenser 74. The output of the oscillator is applied by way of resistor 76 and condenser 77 to an emitter follower 80, the output of which is applied by way of condenser 81 to the input of a squaring amplifier 82.

The oscillator 40 is particularly suitable for detection of RF signals in the frequency range of up to about 10 mc. For this purpose the oscillator 40 will be tuned to have a nominal operating frequency of about 50 mc. Variations in the inductance of the coils 13 and 14 will serve to frequency modulate the output of the oscillator 40. In order to be meaningful, the output of the oscillator must then be suitably detected. Further, the oscillator must be stabilized to avoid drift due to change in temperature of sensor 10 and to those changes in inductance of the coils 13 and 14 which occur in response to magnetic signals which vary at a rate below the RF band.

The FM discriminator 90 includes the squaring amplifier 82 as the first stage thereof. The output of the squaring amplifier 82 is applied by way of channel 91 to one input of a monostable multivibrator 92. One output signal from the multivibrator 92 is applied by a resistor 93 to a transistor 94 which in turn drives transistor 95. The squaring amplifier 82, the monostable multivibrator 92 and the circuits associated with transistors 94 and 95 provide output pulses at point 96 which are constant in amplitude and are of constant pulse width and which are particularly characterized by having fast rise time. Thus, the output of the oscillator 40 is employed in the discriminator 90 to provide pulse time modulation output signals which then are applied to an emitter-follower stage 97 to provide adequate gain to drive a filter 98.

The filter 98 is a low pass filter having a cutoff frequency between the frequency of the 10 mc. RF signal detected by the system and the 50 mc. carrier generated by the oscillator 40. The filter 98 serves to operate on the pulse time modulated pulses at the output of the emitter-follower 97 to produce an output at terminal 99 which is a time-varying voltage representative of the variations in the magnitude of the magnetic component of the RF field applied to the sensor 10.

In order to eliminate the effect on the oscillator 40 of magnetic field components having frequencies below the RF band to be detected, a signal is applied from the output of the emitter-follower 97 by a frequency control unit 100. The signal is applied to the frequency control unit 100 by way of a resistor 101. The control unit 100 includes an operational amplifier 102 which drives an emitter follower stage 103 to provide a feedback voltage which is applied to an integrating condenser 104. The time constant of the frequency control circuit is controlled by the charging and discharging circuit for the condenser 104.

The voltage in the feedback path, namely the voltage at the output of the amplifier 103, is applied by way of conductor 105 to a frequency control circuit 106 in the oscillator 40. The circuit 106 includes a shunt resistor 107, series resistors 108, 109, and series condenser 110. The condenser 110 is connected to the collector of transistor 65. The juncture between resistors 108 and 109 is connected to ground by way of condenser 111. The juncture between resistor 109 and 110 is connected to ground by way of a variable capacitor 112. The capacitor 112 is in the form of the well-known varicap. The use of the control circuit 106 permits control of the oscillator 40 so that the output frequency will not change for variations in the magnetic field which occur at a rate below the RF band. On the other hand, the circuit has a time constant such that the feedback circuit cannot follow variations in the magnetic component of the RF field. Thus the oscillator 40 will produce output signals which vary in frequency in linear relationship with respect to the variations in the RF magnetic field component.

It will be recognized that the circuit of FIGURE 6 differs from the circuit of FIGURE 1 in that no local oscillator is employed in FIGURE 6. Rather, the output of oscillator 40 is fed directly into the discriminator 90. The discriminator includes the filter 98 to eliminate the carrier frequency components. The discriminator also provides a drive for the frequency control feedback loop involving control unit 100 to eliminate from the output those variations in the magnetic field below the RF band.

In contrast with the FM system above-described, an amplitude modulation system is shown in simplified form in FIGURE 7. A ferromagnetic cylinder 50 having a slot 51 therein and windings 52 and 53 thereon, is provided with pole pieces 54 and 55 which serve to concentrate flux in cylinder 50. Such pole pieces may be used in the sensor of FIGURE 1 as well as in the AM system of FIGURE 4. One terminal of winding 53 is connected to ground. One terminal of winding 52 is connected to one terminal of a resistor 56. A signal from a local oscillator 57 is thus controlled as to amplitude by the variation in the inductance of coil 52, 53 which cooperate with resistor 56 as a voltage divider. The signal from oscillator 57 is applied to a cathode follower 58 and, by way of channel 59, to a detector 60.

In FIGURE 7, the information appears as amplitude modulation of the carrier. As the transient field H varies by an amount $\Delta H$, the impedance of the sensor 10 will vary from the value $X_L$ to $(X_L + \Delta X_L)$. The result will be a variation in the amount of oscillator output voltage. At the detector, the result will be a variation ($\Delta V$) in its output. This system can employ a single sideband and thus conserve on the bandwidth requirements. An advantage of this system is that a single coaxial cable 59 can be used for both power and signal. Further, less bandwidth is required which permits the circuitry to be simplified.

The unique instrument provided by the present invention has unusual characteristics which include wide dynamic range, high sensitivity, and good reliability. It has no moving parts and has a low power requirement. It does not have problems, as to wavelength but can be small in size even though low frequency, long wavelength signals are to be detected. Furthermore, the directivity of the sensor is that of a true component device in that the variation measured is the projection of the true value of the field on the axis of the sensor. The sensor has a polar directivity plot identical to that of a cosine curve.

More particularly, the sensor of the present invention has a dipole-like directivity pattern. It is not restricted or limited by the wavelength of the radiation being received. Thus the sensors may be used singly or in combination, depending upon the specific need. Three mutually perpendicular sensors can be used with appropriate circuitry to completely describe the magnetic vector of the radiation being received, in both magnitude and direction. More particularly, two sensors A and B at right angles and a third sensor C in the same plane but at 45° to the other two, can be operated in accordance with $$|A \sin \theta| + |B \cos \theta| - |C \sin (\theta + 45°)| = S$$

and $$A + B = C$$

where A, B, and C are sensitivities of individual sensors and S is the combined unit sensitivity. The units when operated as zero beat units produce an equivalent sensor beam width of 30° at the 3 db points.

The frequency of the output of the circuit of FIGURES 1 and 6 contains all of the information relating to the magnetic component of the electromagnetic radiation received except direction. Direction information is obtained from the sensor orientation. The methods of observing and recording the output data, from either the FM or AM system, are numerous and are well known. The output at terminal 99, FIGURE 6, may be displayed on an oscilloscope. It can be recorded directly on magnetic tape. It can be used to operate counters or discriminators. The particular application will dictate the form of data display or output.

Further in accordance with the invention, the upper end of the frequency spectrum may be controlled by a suitable filter. For one such application, a 20 kc. cutoff filter/shield was constructed from a sheet of .025-inch aluminum foil, 2 inches wide and 6 inches long and a similar size sheet of thermoplastic saran. The saran sheet was placed beneath the aluminum and the layers were wrapped around a 6-inch ferrite rod 2¼ turns. The assembly was tested and found to be slightly lower in cutoff frequency than was desired. Approximately ½ inch was cut from the free end of the warp and the 3 db cutoff point fell within desired limits.

While the parameters of the filter assembly may be calculated, it has been found to be adequate and effective to "cut and try" until the desired performance is achieved. Such an aluminum sheet acts somewhat like a Faraday shield, shorting out between turns, to provide a high frequency cutoff which may be on the order of 6 db per octave. An alternative form of filter may comprise a long, thin strip of an electric conductor and a like strip from a saran sheet wound onto a ferrite core in spiral form to the extent necessary to effect the desired cutoff point.

It will further be appreciated that the sensor of the present invention may be employed in a bridge detecting circuit, rather than in circuits of the type illustrated in FIGURES 1, 6 and 7.

By way of example, in FIGURE 6 where RF signals of 10 mc. are detected, sensor 10 may be a cylinder six inches long and 7/32 inch in diameter. The slot may be 3/32 inch long and 5/64 inch wide. The windings 13 and 14 will have four and two turns of No. 28 wire, respectively. Oscillator 40 will operate in the earth's field at nominally 50 mc. For an RF field of field strength of nominally 20 gammas at 10 mc., the output of oscillator 18 will vary nominally about 400 cycles.

The circuit of FIGURE 6 may have the following additional specifications.

Oscillator 40:

| | | |
|---|---|---|
| Transistor 65 | | PNP–2N3321 |
| Resistor 66 | ohms | 5K |
| Resistor 67 | do | 2.7K |
| Condenser 68 | mf | 0.1 |
| Condenser 69 | pf | 5100 |
| Resistor 71 | ohms | 100 |
| Circuit 72 (0.01 nf) | do | 470 |
| Condenser 74 | pf | 5 |
| Resistor 76 | ohms | 22K |
| Condenser 77 | mf | 0.005 |

Frequency control 106:

| | | |
|---|---|---|
| Resistor 107 | ohms | 1.0K |
| Resistor 108 | do | 100K |
| Resistor 109 | do | 100K |
| Condenser 110 | pf | 5100 |
| Condenser 111 | mf | 0.01 |
| Varicap 112 | pf | 1–10 |

Discriminator 90:

| | | |
|---|---|---|
| Squaring amplifier 82 (Engineered Electronics Company, Santa Ana, Calif.) | | T–312 |
| Multivibrator 92 (Engineered Electronics Company, Santa Ana, Calif.) | | T–166 |
| Resistor 93 | ohms | 4.7K |
| Transistors 94 and 95 | | NPN–2N1304 |
| Emitter follower 97 | | NPN–2N1304, PNP–2N1305 |
| Condenser 122 | mf | 0.01 |
| Resistor 123 | ohms | 15K |
| Resistor 124 | do | 4.7K |
| Resistor 125 | do | 2.7K |
| Resistor 126 | do | 270 |
| Resistor 127 | do | 10K |
| Condenser 128 | mf | 0.01 |
| Resistor 129 | ohms | 2.7K |
| Resistors 130 and 131 | do | 470 |
| Resistors 132 and 133 | do | 10 |
| Resistor 134 | do | 4.7K |
| Resistors 101 | do | 11.1K |
| Amplifier 102 (A–Philbrick 1178) | | PP55 |
| Clipper 135 (Zener diode) | | 4.3AZ5 |
| Resistor 136 | ohms | 33K |
| Resistor 138 | do | 22K |
| Potentiometer 139 | do | 50K |
| Condenser 140 | mf | 25 |
| Condenser 104 | mf | 0.44 |

Pretreatment as above noted involves fixing an operating point to optimize the system. In FIGURE 5 discrete magnets are employed. In a further embodiment, permanent magnet particles are incorporated directly in the sensor rod. Alnico particles thus distributed throughout the rod will be of character to fix the operating point. Preferably the point will be such that the derivative of a plot of incremental permeability vs. H will be linear over a range of H greater than twice the earth's magnetic field. Therefore, point 32c, FIGURE 3, is located on that portion of the B–H curve where the second derivative of the curve has a plateau extending in the direction of the H axis which plateau in length is preferably at least twice the magnitude of the earth's magnetic field. When this is the case, there will be no change in sensitivity for any orientation of the unit in the earth's field.

Having described the invention in connection with certain specific embodiments thereof, it is to be understood that further modifications may now suggest themselves to those skilled in the art and it is intended to cover such modifications as fall within the scope of the appended claims.

We claim:
1. In an RF receiver, a sensor which comprises:
 (a) a rod of a ferrite material having a high Q at the upper end of the RF band,
 (b) permanent magnet means for holding magnetization of said rod at a predetermined point of high incremental permeability, and
 (c) a coil passing through a central aperture in said rod and connected to said receiver for control of said receiver in dependence upon changes in said incremental permeability at RF frequencies.

2. An RF receiver which comprises, in combination:
 (a) a rod having a central aperture and formed of ferrite material having a high Q at radio frequencies,
 (b) at least one coil, the turns of which pass through said aperture,
 (c) circuit means for detecting variations in impedance of said coil as a function of magnetization of said rod, and
 (d) high pass filter means to eliminate the effect in said circuit means of variations in permeability at rates below said radio frequencies.

3. An RF receiver which comprises, in combination:
 (a) a rod having a length to diameter ratio of about 25 with a central aperture therethrough and formed of ferrite material having a high Q at frequencies at least four times the frequency of the RF signal to be detected,
 (b) at least one coil, the turns of which pass through said aperture,
 (c) circuit means for detecting variations in impedance of said coil as a function of magnetization of said rod, and
 (d) high pass filter means to eliminate the effect in said circuit means of variations in permeability at rates below the frequency of said RF signal.

4. The combination set forth in claim 3 wherein said circuit means comprises an oscillator controlled as to frequency by said coil and operating at a nominal frequency about four times the frequency of said RF signal and wherein said high pass filter means comprises a feedback loop extending from the output to the input of said oscillator, which loop has a time constant which is long compared with the period of said RF signal.

5. The method of detecting the magnetic component of RF electromagnetic waves with a ferrite rod having a coil wound through a central transverse opening in said rod, which comprises:
 (a) magnetizing said rod to saturation,
 (b) decreasing and, under a permanent magnetic force, holding the magnetization of said rod at a level corresponding to a point spaced from the H axis of the hysteresis loop for the material from which said rod is formed, and
 (c) sensing RF variations in magnetization of said rod relative to said point.

6. The method of detecting the magnetic component of RF electromagnetic waves with a ferrite rod having a coil wound through a central transverse opening in said rod, which comprises:
 (a) magnetizing said rod to saturation,
 (b) decreasing and, under a permanent magnetic force, holding the magnetization of said rod at a level corresponding to a point spaced from the H axis of the hysteresis loop for the material from which said rod is formed,
 (c) generating a carrier of frequency at least four times the frequency of said RF waves, and
 (d) modulating said carrier in proportion to variations in magnetization of said rod relative to said point produced by the magnetic component of said RF waves.

7. The method of detecting the magnetic component of RF electromagnetic waves with a ferrite rod having a coil wound through a central transverse opening in said rod, which comprises:
 (a) magnetizing said rod to a first degree,
 (b) decreasing and, under a permanent magnetic force, holding the magnetization of said rod at a level corresponding to a point spaced from the H axis of the hysteresis loop for the material from which said rod is formed, and (c) sensing RF variations in magnetization of said rod relative to said point.

8. The method set forth in claim 7 in which magnetization of said rod is accomplished by positioning at least one permanent magnet adjacent to one end of said rod and thereafter, increasing the spacing to a predetermined spacing at which said magnet biases said rod to a level of magnetization corresponding with a point on the B–H curve for said rod at which the second derivative is substantially flat.

9. The method set forth in claim 8 in which the force of two permanent magnets applied to opposite ends of said rod magnetizes and biases said rod.

10. The method of detecting the magnetic component of RF electromagnetic waves with a ferrite rod having a coil wound through a central transverse opening in said rod with a sensitivity independent of orientation of said rod in the earth's field, which comprises:
  (a) magnetizing said rod to a first degree,
  (b) decreasing and, under a permanent magnetic force, holding the magnetization of said rod at a level corresponding to a point on the B–H curve for the material from which said rod is formed at which the second derivative is flat for at least about twice the magnitude of the earth's magnetic field, and
  (c) sensing RF variations in magnetization of said rod relative to said point.

11. In an RF receiver, a sensor which comprises;
  (a) a rod of a ferrite material having a high Q at the upper end of the RF band and a variable incremental permeability,
  (b) a coil passing through a central aperture in said rod and connected to the input of said receiver for control of the output level of said receiver in dependence upon changes in said incremental permeability at RF frequencies, and
  (c) permanent magnet means for biasing said rod to a level of magnetization corresponding with a point on the B–H curve for said rod where the incremental permeability is maximum.

12. The combination set forth in claim 11 in which said permanent magnet means comprises two permanent magnets supported in fixed relation adjacent to the ends of said rod.

13. The combination set forth in claim 11 in which said permanent magnet means comprises permanent magnet material distributed throughout said rod.

14. An RF receiver responsive only to the magnetic component of RF waves which comprises:
  (a) a sensor of ferromagnetic material having a central transverse aperture and in which the incremental permeability changes the flux in response to said RF waves,
  (b) a sensor oscillator circuit having a coil therein wound through said aperture in said sensor tuned to a frequency substantially above the frequency of said RF waves to produce an RF signal which varies in frequency in response to variation in said incremental permeability,
  (c) means for rendering said sensor signal independent of changes in said incremental permeability below a predetermined rate, and
  (d) utilization means connected to the output of said oscillator to utilize said RF signal.

15. A system for detecting the magnetic component of RF electromagnetic waves comprising:
  (a) a ferrite rod having a coil wound through a central traverse opening therein,
  (b) means for applying a permanent magnetic force to said rod to hold the magnetization of said rod at a level corresponding to a point on the B–H curve for ferrite material at which the second derivative is flat for at least about twice the magnitude of the earth's magnetic field, and
  (c) means for sensing RF variations in magnetization of said rod relative to said point.

References Cited

UNITED STATES PATENTS

| | | | |
|---|---|---|---|
| 2,997,647 | 8/1961 | Gaugler et al. | 324—43 |
| 3,040,247 | 6/1962 | Van Allen | 324—43 |
| 3,207,978 | 9/1965 | Sarkissian | 324—43 |
| 3,271,665 | 9/1966 | Castro et al. | 324—43 |
| 3,319,161 | 5/1967 | Beynon | 324—47 |

KATHLEEN H. CLAFFY, Primary Examiner

R. S. BELL, Assistant Examiner

U.S. Cl. X.R.

307—88; 324—43; 325—365, 376